(12) United States Patent
Rotenstein (10) Patent No.: US 8,760,322 B2
(45) Date of Patent: Jun. 24, 2014

(54) TRANSMISSION OF PATHOLOGICAL DATA PATTERNS

(75) Inventor: Sergiu Rotenstein, Oak Park, CA (US)

(73) Assignee: MRV Communications Americas, Inc., Chelmsford, MA (US)

(*) Notice: Subject to any disclaimer, the term of this patent is extended or adjusted under 35 U.S.C. 154(b) by 157 days.

(21) Appl. No.: 13/245,773

(22) Filed: Sep. 26, 2011

(65) Prior Publication Data

US 2012/0014698 A1 Jan. 19, 2012

Related U.S. Application Data

(63) Continuation of application No. 12/660,587, filed on Mar. 1, 2010, now Pat. No. 8,026,836, which is a continuation of application No. 11/512,605, filed on Aug. 29, 2006, now Pat. No. 7,688,231.

(60) Provisional application No. 60/712,335, filed on Aug. 29, 2005.

(51) Int. Cl.
*H03M 7/00* (2006.01)

(52) U.S. Cl.
USPC .......................................... 341/50; 375/296

(58) Field of Classification Search
USPC ................. 341/50; 375/296, 240.01, 240.02, 375/240.12, 240.25; 382/239, 233, 238; 398/164
See application file for complete search history.

(56) References Cited

U.S. PATENT DOCUMENTS

| 6,233,718 | B1 | 5/2001 | Vernon et al. |
| 6,618,095 | B1 | 9/2003 | Takeuchi et al. |
| 6,907,202 | B1 | 6/2005 | Ide et al. |
| 7,688,231 | B2 | 3/2010 | Rotenstein |
| 7,689,128 | B2 * | 3/2010 | Williams ...................... 398/164 |
| 7,986,748 | B2 * | 7/2011 | Akkarakaran et al. ........ 375/296 |
| 2002/0102097 | A1 | 8/2002 | Kobayashi |
| 2004/0022330 | A1 | 2/2004 | Shiozawa et al. |

OTHER PUBLICATIONS

International Search Report and Written Opinion for PCT Application No. PCT/US2006/33818, dated Aug. 8, 2007.

* cited by examiner

*Primary Examiner* — Joseph Lauture
(74) *Attorney, Agent, or Firm* — Dickstein Shapiro LLP (57) ABSTRACT

A method and apparatus is presented for reducing or eliminating pathological data patterns from signals for transmission over optical communications systems. One embodiment includes a decoder/deserializer configured to receive an encoded serial digital signal, a ditherer configured to dither a least significant bit of each digital data word, and a reserializer/encoder configured to serialize digital data and encode it, for example according to an applicable communication standard such as SMPTE 259M. The improvements may be provided in a single removable unit, such as a small form-factor pluggable (SFP) module compatible with existing optical communications equipment.

14 Claims, 8 Drawing Sheets

TRANSMISSION OF PATHOLOGICAL DATA PATTERNS

This application is a Continuation of co-pending U.S. patent application Ser. No. 12/660,587 filed Mar. 1, 2010, which is a Continuation of U.S. patent application Ser. No. 11/512,605, filed Aug. 29, 2006, which claims the benefit under 35 U.S.C. §119(e) of U.S. Provisional Application No. 60/712,335 filed Aug. 29, 2005, the contents of all three applications being herewith incorporated by reference in their entirety.

FIELD OF THE INVENTION

The present invention relates to devices, systems, and methods of data communication and, more particularly, to data communication of digital video signals.

BACKGROUND OF THE INVENTION

Communication of digital data, especially digital video data, can be a demanding enterprise. The desire for improved performance has led investigators to attempt alternative methods and modes of communicating digital video. As a result, a wide variety of data communications technologies, including equipment, standards, protocols, etc., have been developed with varying performance characteristics.

One standard for transporting digital video data is known as SMPTE 259M, developed by the Society of Motion Picture and Television Engineers (SMPTE) for communication over coaxial cables. This standard describes a method for use with switched or dedicated interconnecting cables with one signal per cable confined to relatively short distance communication, for example within a building or campus environment.

Recent applications of the SMPTE 259M standard have indicated a need to extend its use to conditions differing from those originally contemplated. For example, users have indicated a desire to employ the standard for data communication over longer distances, over alternative physical media such as optical fibers, and without the limitation of one signal per cable. Recent improvements in fiber optic communications systems have spurred interest in combining SMPTE 259M signals with other signal types in a multi-service fiber backbone, for example a dense wavelength division multiplexed (DWDM) backbone.

One problem with communicating SMPTE 259M signals over optical communications systems involves the content of the signals and how that content affects the performance of certain optical devices employed in the system. For example, certain signals known as "pathological signals" can adversely affect the power control circuitry of optical transmitters and/or receivers and increase signal-to-noise ratio, bit error rate, intersymbol interference, and/or other adverse effects. One exemplary pathological signal includes a repeating pattern of digital bits in which one bit (either high or low) is followed by nineteen consecutive bits of the opposite polarity, i.e. 01111111111111111111 or 10000000000000000000. Such a pathological signal may include significant low frequency content and may disrupt system devices not designed for low frequency signals.

Optical transmitters commonly include power control circuitry that may attempt to keep the average optical output power at a predetermined level to compensate for degradation of the laser threshold over time and temperature. The power control circuitry responds according to a long time constant relative to the modulation waveform of the transmitted data signal, essentially using the DC portion of the modulation spectrum for laser output power control. If a transmitted data signal includes significant low frequency content, the transmitted waveform may be distorted by the power control circuitry, as illustrated in FIG. 2.

Figure 2:
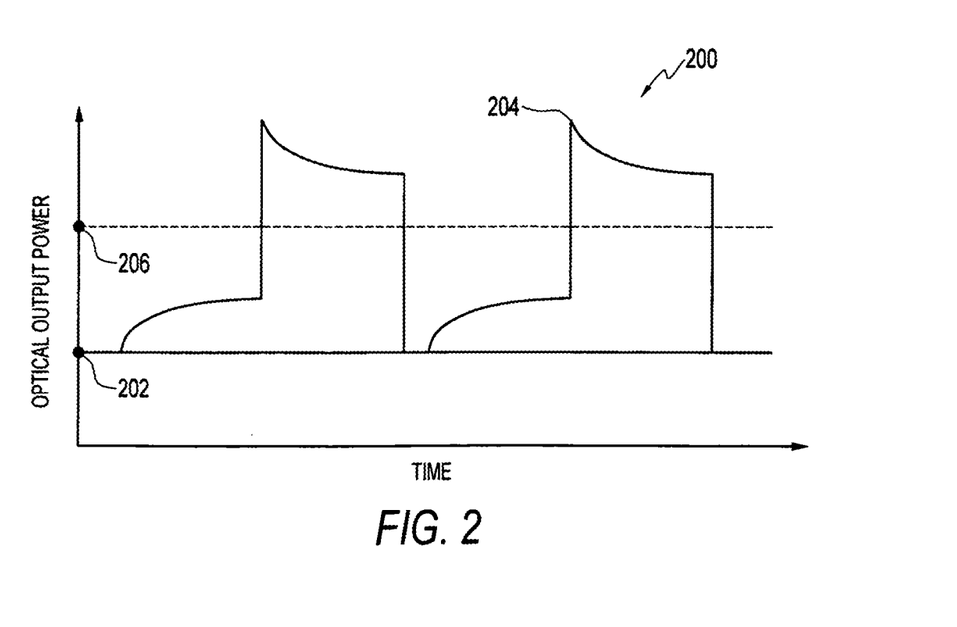
FIG. 2 illustrates a simplified plot of time versus optical output power for an exemplary optical communications device.

FIG. 2 is a simplified plot 200 of time versus optical output power for an exemplary optical transmitter driven with low frequency data. The optical transmitter's power control circuitry tends to increase or decrease the optical output power toward the average optical output power 206 over time, thus distorting the waveform at peak output power 204 (e.g. corresponding to long runs of high bits or ones) and at lower output power near the laser threshold 202 (e.g. corresponding to long runs of low bits or zeros). Such waveform distortions may cause the bit error rate and picture quality at the receiver to suffer.

Optical receivers and transmitters often used in optical communications systems are commonly designed under an assumption that the signal being transmitted is a 50% duty cycle modulating (e.g. AC-balanced) signal over some period of time such as 1 ps. For digital video data, an exemplary pathological signal including the repeating pattern with 1:19 ratio of ones to zeros described above may continue for up to about 50 ps, which of course fails to conform to the design assumption. During such pathological signals, the average optical output power may increase or decrease, significantly distorting the transmitted waveform and possibly causing overmodulation and/or adversely affecting signal-to-noise ratio. Overmodulation of the optical transmitter may cause additional waveform distortion and ringing, leading to intersymbol interference as the laser drive current moves into nonlinear regions of the light versus current (LI) curve such as that shown in FIG. 1.

Figure 1:
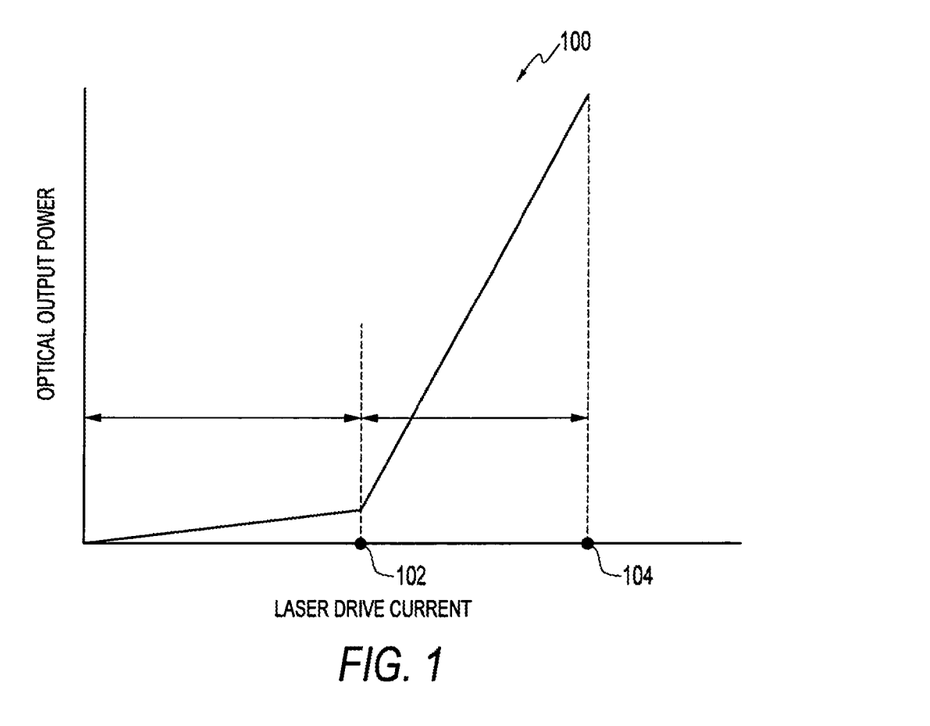
FIG. 1 illustrates a simplified plot of laser drive current versus optical output power for an exemplary optical communications device.

FIG. 1 is a simplified plot 100 of laser drive current versus optical output power for an exemplary optical transmitter. As the drive current decreases from its level at peak optical output power 104 to the laser threshold 102, overmodulation can result in spectral broadening of the laser output as the laser acts more like an LED, for example when the drive current approaches the "knee" of the LI curve (e.g. near the laser threshold 102). In this way, waveform distortion can result in intersymbol interference which in turn may cause increased bit error rate, corruption of video data, and/or degradation of picture quality.

Therefore, there is a need to solve the above-described problems associated with transporting data including pathological signals over optical communications systems.

SUMMARY OF THE INVENTION

In light of the foregoing the inventors have concluded that there is a need for an improved method of communicating data signals over optical communications systems in which the adverse effects of pathological signals are reduced or eliminated. The inventors have recognized that many, if not all, of the described adverse effects of pathological signals may be avoided by "dithering," or adding a small amount of noise to the least significant bit of each data word in parallel form. Such dithering may break up the repeated nature of pathological signals, thus avoiding any associated adverse effects.

The inventors have realized that dithering may be applied in addition to encoding prescribed by applicable communication standards such as SMPTE 259M. Accordingly, the inventors have appreciated that a signal encoded according to an applicable communication standard such as SMPTE 259M may be decoded and de-serialized, the resulting parallel digital data signal may have its least significant bit dithered, and serialization and encoding steps according to the standard such as SMPTE 259M may be re-applied, in preparation for transporting the signal over one or more optical communications systems including a multi-service fiber backbone.

Likewise, the inventors have realized that certain types of dithering are reversible, permitting mathematically-equivalent recovery of the originally encoded signal on the receiver end of an optical communications system. Accordingly, the inventors have appreciated that a transported signal encoded according to an applicable communication standard such as SMPTE 259M may be decoded and de-serialized, the resulting parallel digital data signal may have its least significant bit un-dithered, and serialization and encoding steps according to the standard such as SMPTE 259M may be re-applied, thereby restoring the transported signal to its originally encoded state, including any pathological data patterns.

As will be described below, the inventors have developed various embodiments of the invention according to these and other discoveries. According to one embodiment of the invention, an improved device is provided for preparing signals (e.g. including any pathological data patterns) for transmission over optical communications systems, including a decoder/deserializer configured to receive an encoded serial digital signal, a ditherer configured to dither a least significant bit of each digital data word, and a reserializer/encoder configured to serialize digital data and encode it, for example according to an applicable communication standard such as SMPTE 259M. One embodiment of the invention provides the improved device in a single removable unit, such as a small form-factor pluggable (SFP) module compatible with existing optical communications equipment.

An exemplary embodiment of the invention for use on the receiving end of an optical communication system includes a decoder/deserializer configured to receive a serial digital signal encoded for example according to an applicable communication standard such as SMPTE 259M, an un-ditherer configured to un-dither a least significant bit of each digital data word, and a reserializer/encoder configured to receive and serialize digital data and encode it, for example according to the standard such as SMPTE 259M, thereby restoring the signal to its original state (e.g. including any pathological data patterns) for further transportation and/or processing. One embodiment of the invention provides the improved device in a single removable unit, such as a small form-factor pluggable (SFP) module compatible with existing optical communications equipment.

In an optical communications system, the improved devices may be used both for preparing signals for transmission on the transmitting end and recovering signals equivalent to the originally encoded signals on the receiving end. One embodiment of such a system includes a decoder/deserializer, ditherer for dithering a least significant bit, and a reserializer/encoder in the transmit path, as well as a decoder/deserializer, un-ditherer for un-dithering a least significant bit previously dithered, and a reserializer/encoder in the receive path. One embodiment of such a system includes each of these receive-path and transmit-path devices on the transmitting end of a multi-service fiber backbone, and additional receive-path and transmit-path devices on the receiving end of the multi-service fiber backbone.

A method according to one embodiment includes receiving a serial digital signal encoded for example according to an applicable communication standard such as SMPTE 259M (e.g. including any pathological data patterns), decoding and de-serializing the digital signal, dithering a least significant bit, and re-serializing and encoding the digital signal for example according to SMPTE 259M. One embodiment of the invention includes receiving a serial digital signal encoded for example according to SMPTE 259M that has been transported over an optical communications system, decoding and de-serializing the digital signal, un-dithering a least significant bit, and re-serializing and encoding the digital signal for example according to SMPTE 259M thereby restoring a signal equivalent to its original state (e.g. including any pathological data patterns) for further transport and processing.

When employed in the context of optical communications, embodiments of the present invention significantly improve transmission of signals encoded for example according to an applicable communication standard such as SMPTE 259M (e.g. including any pathological data patterns) over advanced optical communications networks including, for example, a multi-service DWDM fiber backbone. Methods and devices embodying these advantages may be provided in a form suitable for use with conventional data transmission networks and at a reasonable cost.

The present invention together with the above and other advantages may best be understood from the following detailed description of the embodiments of the invention illustrated in the following drawings.

DETAILED DESCRIPTION

The following description is provided to enable a person of ordinary skill in the art to make and use the disclosed inventions and sets forth the best modes presently contemplated by the inventors for carrying out their inventions. In the following description, for purposes of explanation, numerous specific details are set forth in order to provide a thorough understanding of the described inventions. It will be apparent to one skilled in the art, however, that the inventions may be practiced without these specific details. In other instances, structures and devices are shown in block diagram (or otherwise simplified) form for clarity of presentation.

In the following discussion, the singular term "signal" and plural term "signals" are used interchangeably and are to be understood as including analog or digital information, at a single frequency or a plurality of frequencies, and may or may not include coding, modulation, sideband information, or other features of signals or waveforms well known in the art. Furthermore, when reference is made to a "receiver," "transmitter," "output," or "input," previous process steps may have been utilized to form signals or waveforms compatible with these features. In addition, no particular order is required for the method steps described below, with the exception of those logically requiring the results of prior steps, for example re-serializing a signal may logically require the prior de-serializing of that signal. Otherwise, enumerated steps are provided below in an exemplary order which may be altered, for instance the several processing steps may be rearranged or performed simultaneously.

One or more embodiments of the invention will be described with reference to the SMPTE 259M standard for transporting serial digital interface (SDI) uncompressed digital video data. However, the invention and its various embodiments are not so limited, and the invention may be employed in conjunction with other types of data and in conjunction with other standards, means, and modes of data communication including, for example high-definition digital video data communications in accordance with the SMPTE 292M standard.

The various SMPTE standards for transmitting digital video data over serial data links were developed in part with the goal of permitting greater flexibility and ease of communicating such data between users. As networking technology has advanced, users have naturally tended to "push the envelope" and attempt to apply the standards in contexts beyond those originally contemplated.

The expanding infrastructure of high-speed data networks developed by the telecommunications industry has enticed users with large amounts of bandwidth and a relatively economical cost structure. Users looking to transport digital video data over longer distances, to new places, and/or in a more flexible environment have investigated application of the existing serial digital video standards to such data networks. These users have encountered a number of problems.

Among the problems that have been encountered include those related to the content of the signals being transmitted. It is well known that the transmission of digital data signals over networks can be improved by encoding the digital data to, for example, reduce the low frequency content of such signals. Standards for transmitting digital video data, including for example the SMPTE 259M standard, prescribe that a reversible transformation or encoding be applied to the serial data stream in order to guarantee transitions of at least one bit in each digital word transmitted.

Figure 3:
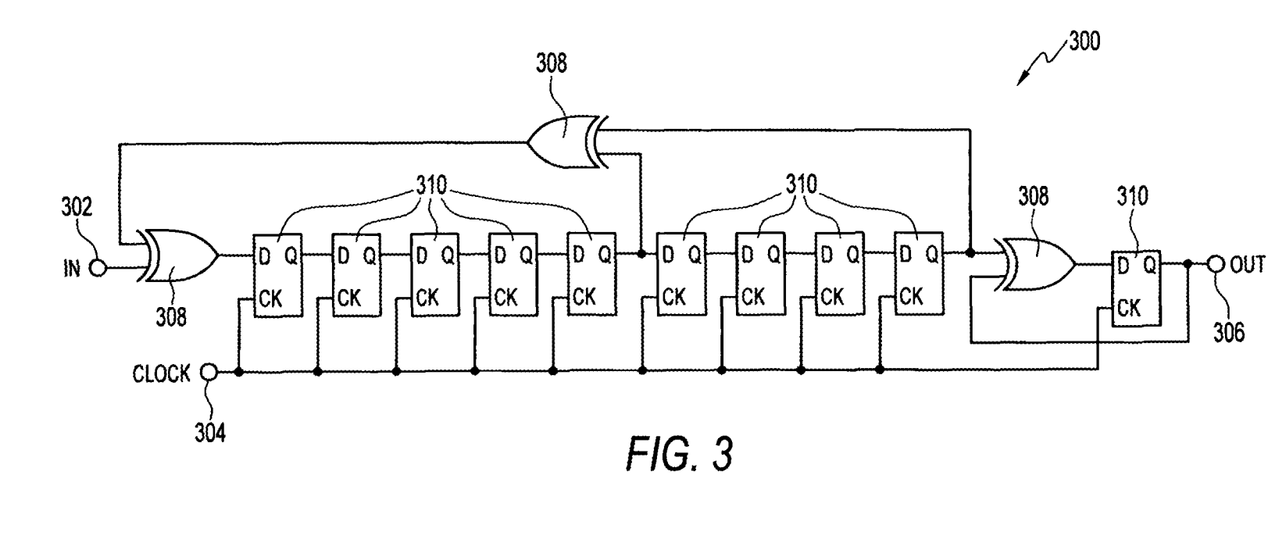
FIG. 3 illustrates a simplified schematic diagram of an exemplary pseudo random sequence generator in accordance with one embodiment of the invention.

As an example, the SMPTE 259M standard prescribes that a scrambler of the type shown in simplified schematic form in FIG. 3 should be applied to the serial digital video data stream. Referring to FIG. 3, a scrambler 300 may be formed with D flip-flops 310 and exclusive OR (XOR) gates 308 configured as shown. A feedback shift register formed from the D flip-flops 310 includes feedback taps strategically placed to generate a maximum-length pseudo-random number sequence when employed with the XOR gates 308 as shown. A clock input 304 is included to coordinate operation of the scrambler 300 according to the desired frequency.

In operation, the serial data stream is applied at the data input 302 and a clock signal is applied at clock input 304, resulting in a scrambled serial data stream at the data output 306. For a known initialization state of the D flip-flops 310, scrambling of the serial data stream at the data output 306 is reversible, permitting recovery of the input serial data stream using a reciprocal configuration as is well known in the art.

For the scrambler 300 as shown in FIG. 3, the scrambling polynomial is $$G(X)=(X^9+X^4+1)(X+1)$$

which includes both a pseudo-random sequence generator $(X^9+X^4+1)$ non-return-to-zero (NRZ) to non-return-to-zero inverted (NRZI) converter $(X+1)$.

To avoid transportation of clock signals in addition to data signals, the scrambling technique employing scrambler 300 may be self-synchronized, so that a clock signal must be generated at the receiver device that is equivalent to that at the transmitter, for example clock recovery using a phase locked loop (PLL) device. Because PLL devices in common use may be particularly sensitive to data errors (e.g. caused by alignment jitter or phase differences between the recovered clock and input signal, bit misidentification, etc.), such data errors should preferably be minimized during transmission and reception of the transported data signal.

Although the scrambler 300 effectively guarantees transitions between high and low (i.e. 1 and 0) states at the output for each digital data word, serial digital video data may present additional problems. Other types of digital data ordinarily produce an uncorrelated signal, in which each digital data word is unrelated to the previous digital data word. Rather, it is highly unlikely that the same digital data word or series of digital data words would repeat or recur in the exact same sequence for a prolonged period.

However, serial digital data, unlike other types of digital data, often produces a highly correlated signal. A serial digital video signal may exhibit the same bit pattern repeated over and over, for example for an entire active picture scan line of digital video or for an entire frame or sequence of frames. A highly correlated signal of this type may produce one or more pathological signals that are not eliminated by a scrambling technique such as that prescribed by SMPTE 259M and described above with reference to FIG. 3.

For a highly correlated signal, a scrambler 300 of the type shown in FIG. 3 may fail to eliminate the adverse effects of pathological signals. For a 10-bit data word, the guaranteed transition may occur only in one bit, resulting in a long run of high bits, e.g., 0111111111 to 1111111111, or low bits, e.g. 1000000000 to 0000000000. When repeated many times, the signal may continue to exhibit low frequency content, possibly resulting in the previously mentioned data errors and corruption.

In response to this problem, the Society of Motion Picture and Television Engineers (SMPTE) has provided an Engineering Guideline, EG34, suggesting that a small amount of noise be added to the serial digital video signal to eliminate the repeating pathological pattern without compromising the integrity of the serial digital video data signal. One arrangement for implementing this guideline is illustrated in FIG. 4.

Figure 4:
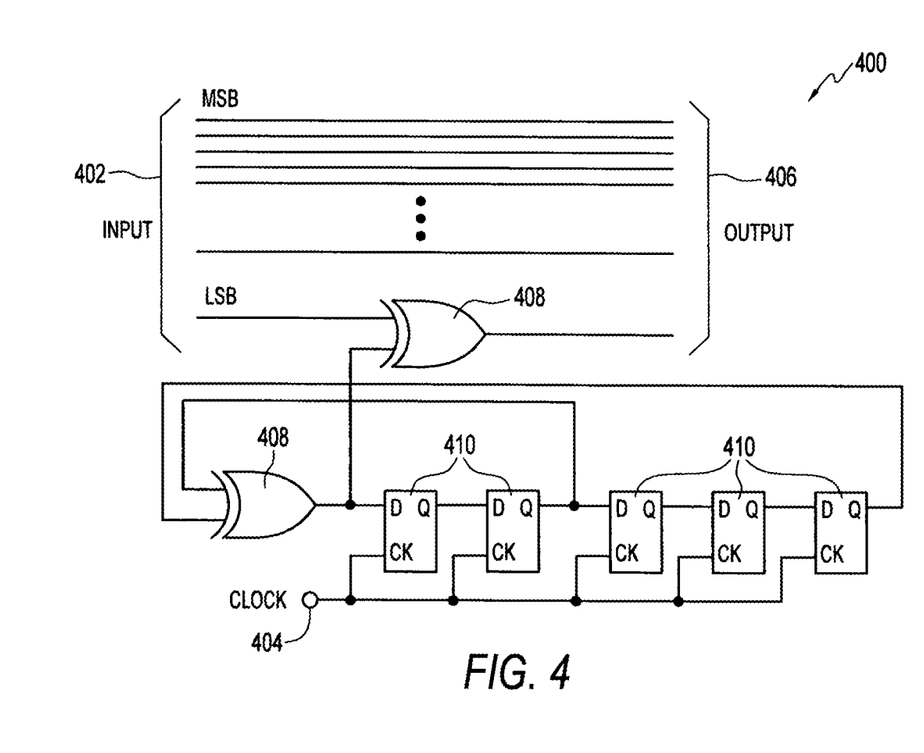
FIG. 4 illustrates a simplified schematic diagram of an exemplary dithering configuration in accordance with one embodiment of the invention.

FIG. 4 shows a configuration 400 for "dithering," or adding a pseudo-random sequence of transitions, to the least significant bit of each digital data word. The dithering is applied to the video data in parallel form, and thus prior to any scrambling such as that prescribed by SMPTE 259M, for example.

Referring to FIG. 4, digital video data in parallel form is received at the input 402. The most significant bit (MSB) of each digital data word is shown at the top of input 402 and the least significant bit (LSB) is shown at the bottom of input 402. The exemplary configuration 400 includes D flip-flops 410 and exclusive OR (XOR) gates 408 arranged in a feedback shift register with feedback taps for forming a pseudo-random sequence generator with scrambling polynomial:

$$G(X)=X^5+X^2+1$$

A clock input 404 is included to coordinate operation of the configuration 400 according to the desired frequency. In operation, the configuration 400 introduces noise in the least significant bit of the video data signal, effectively breaking up the repeating nature of the pathological signal. The dithering is applied to the least significant bit (LSB) as shown in FIG. 4, such that a dithered digital video data signal in parallel form is provided at the output 406.

Similar to the scrambler 300 illustrated in FIG. 3, for a known initialization state the dithering introduced using the configuration 400 is reversible, for example at the receiving end of an optical communications system, permitting recovery of the input data pattern using a reciprocal configuration as may readily be understood by a person skilled in the art.

Figure 5:
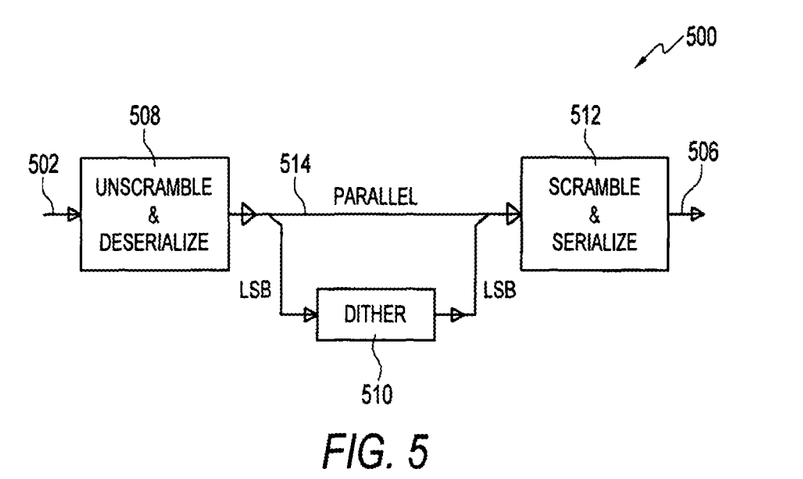
FIG. 5 illustrates a simplified schematic diagram of an exemplary configuration for processing a serial digital signal in accordance with one embodiment of the invention.

Dithering of the type described in FIG. 4 may be applied to a serial digital video data stream as shown in FIG. 5. FIG. 5 shows a signal dithering device 500 in block diagram form, according to one embodiment of the invention. FIG. 5 illustrates the signal dithering device 500 for dithering a serial digital data stream previously encoded according to a known standard, for example the SMPTE 259M standard, including a decoding/de-serialization block 508, a parallel data bus 514, a dithering block 510, and an encoding/re-serialization block 512.

In operation, a serial digital video signal is received at input 502. In accordance with this embodiment of the invention, the serial digital video signal has previously been scrambled according to a known standard, for example SMPTE 259M, to permit effective data transmission or processing via coaxial cable or other means (not shown), but may nevertheless include pathological data patterns. The serial digital video signal received at input 502 is unscrambled in accordance with the known standard and de-serialized (e.g. converted from serial to parallel form) in the decoding/de-serialization block 508. The resulting video data signal in parallel form has its least significant bit dithered in the dithering block 510, as described above with reference to FIG. 4. The dithered parallel video data signal is then re-serialized (e.g. converted from parallel to serial form) and encoded according to the known standard in the encoding/re-serialization block 512. At the output 506, the encoding/re-serialization block 512 provides the resulting dithered serial digital data stream (e.g., without pathological data patterns). Alternate embodiments of the invention may permit decoding and encoding in the blocks 508, 512 according to a variety of standards and arrangements, as should be apparent to those skilled in the art.

Figure 6:
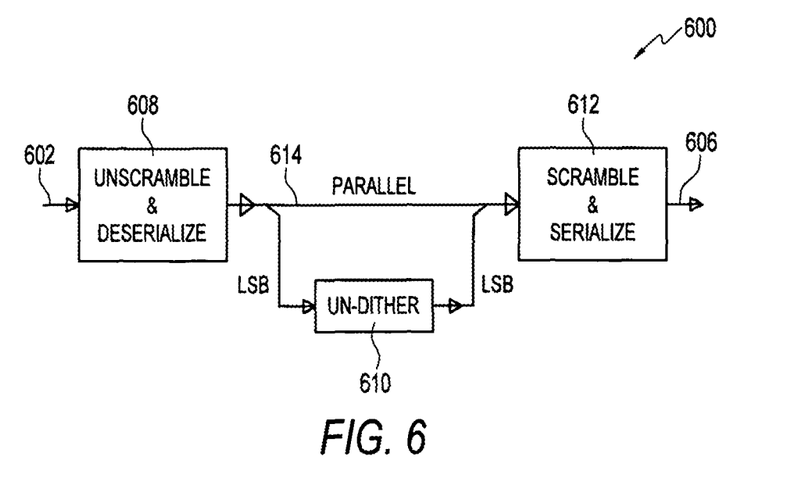
FIG. 6 illustrates a simplified schematic diagram of an exemplary configuration for reversing signal processing of FIG. 5 in accordance with another embodiment of the invention.

FIG. 6 illustrates a device 600 for un-dithering a serial digital data stream previously dithered, such as a serial digital stream dithered in the manner shown and described with reference to FIG. 5. FIG. 6 shows a signal un-dithering device 600 in block diagram form according to one embodiment of the invention, including a decoding/de-serialization block 608, a parallel data bus 614, an un-dithering block 610, and an encoding/re-serialization block 612.

In operation, a serial digital video signal is received at input 602. In accordance with this embodiment of the invention, the serial digital video signal has previously been dithered (e.g. as shown in FIG. 5) and scrambled according to a known standard, for example SMPTE 259M, to permit effective data transmission or processing via coaxial cable or other means (not shown). The serial digital video signal received at input 602 is unscrambled in accordance with the known standard and de-serialized (e.g. converted from serial to parallel form) in the decoding/de-serialization block 608. The resulting video data signal in parallel form has its least significant bit un-dithered in the un-dithering block 610, thereby reversing the dithering described above with reference to FIGS. 4 and 5. The un-dithered parallel video data signal is then re-serialized (e.g. converted from parallel to serial form) and encoded according to the known standard in the encoding/re-serialization block 612. At the output 606, the encoding/re-serialization block 612 provides the resulting serial digital data stream (e.g. including any pathological signal patterns). Again, alternate embodiments of the invention may permit decoding and encoding in the blocks 608, 612 according to a variety of standards and arrangements, as should be apparent to those skilled in the art. In various embodiments of the invention, the device 600 for un-dithering may be functionally identical or complementary to the signal dithering device 500.

Figure 7:
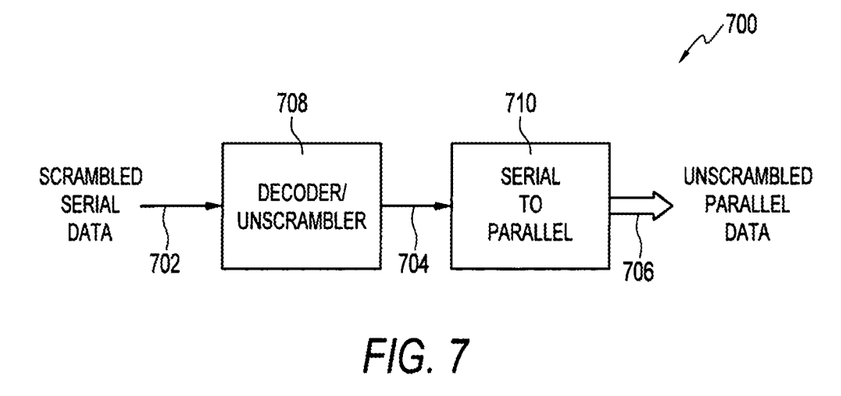
FIG. 7 illustrates a simplified schematic diagram of an exemplary decoding and deserialization configuration in accordance with one embodiment of the invention.

FIG. 7 illustrates an exemplary configuration 700 for the decoding/de-serialization blocks 508, 608 (see FIGS. 5, 6) in accordance with one embodiment of the invention. The configuration 700 includes an input serial data bus 702, a decoder 708, a serial coupler 704, a de-serializer 710, and an output parallel data bus 706.

In operation, a serial digital data stream encoded according to a known standard, for example SMPTE 259M, is received at the input serial data bus 702 and descrambled at the decoder 708. The decoder 708 reverses the encoding prescribed by the known standard to produce an unscrambled serial digital data stream. The decoded serial digital data stream is converted to parallel form at the de-serializer 710, for example using a demultiplexer as is well known in the art, and output at the output parallel data bus 706.

Figure 8:
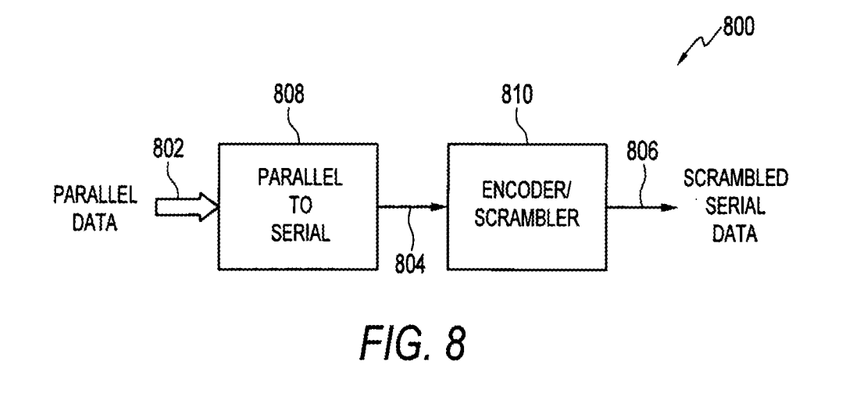
FIG. 8 illustrates a simplified schematic diagram of an exemplary serialization and encoding configuration in accordance with one embodiment of the invention.

FIG. 8 illustrates an exemplary configuration 800 for the encoding/re-serialization blocks 512, 612 (see FIGS. 5, 6) in accordance with one embodiment of the invention. The configuration 800 includes an input parallel data bus 802, a re-serializer 808, a serial coupler 804, an encoder 810, and an output serial data bus 806.

In operation, a parallel digital data stream is received at the input parallel data bus 802 and converted to serial form at the re-serializer 808, for example using a multiplexer as is well known in the art. The encoder 810 encodes the serial digital data stream according to a known standard, for example SMPTE 259M (see FIG. 3), to permit effective data transmission or processing. The resulting encoded serial digital data stream is provided at the output serial data bus 806.

Figure 9:
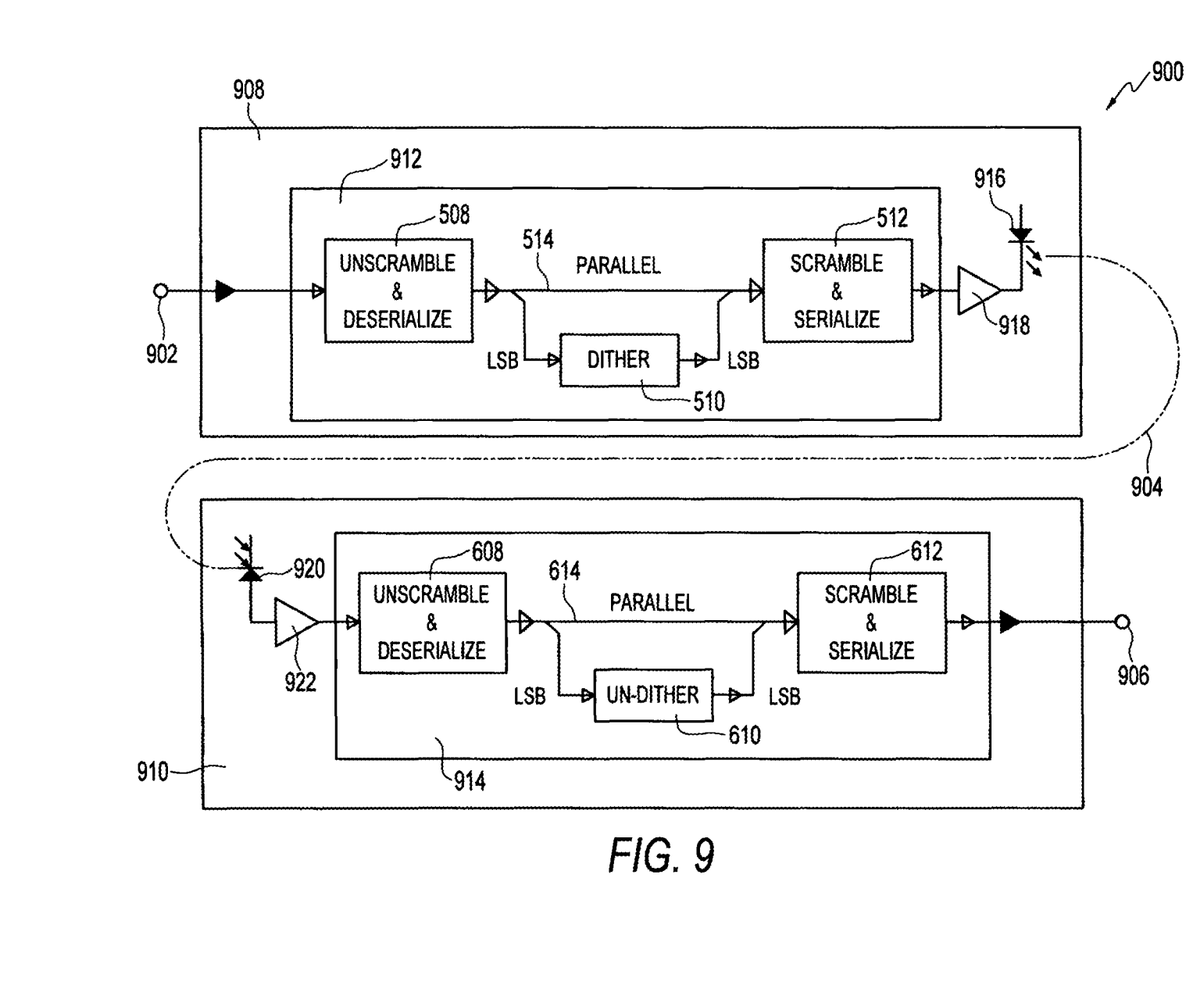
FIG. 9 illustrates a simplified schematic diagram of an exemplary optical communications system in accordance with one embodiment of the invention.

FIG. 9 shows an optical transmission system 900 utilizing dithering to eliminate pathological data patterns in accordance with another embodiment of the invention. The optical transmission system includes a transmitter device 908, one or more fiber optic pathways 904, and a receiver device 910. The transmitter device 908 includes an input 902 adapted to receive a serial digital video data signal encoded according to a known standard, for example SMPTE 259M, a signal dithering device 912 such as the signal dithering device 500 shown and described with reference to FIG. 5, and an optical communications amplifier 918 and optical source 916. The receiver device 910 includes an optical receptor 920 and optical communications amplifier 922, an un-dithering device 914 such as the device 600 shown and described with reference to FIG. 6, and an output 906 adapted to provide a serial digital video data signal encoded according to the known standard employed in transmitting device 908 or some other standard or encoding method desired by a user.

The optical communications amplifier 918 and optical source 916 may be any combination suitable for use in optical communications transmission, for example a laser diode or light-emitting diode (LED) and compatible amplifier configured for use with optical fibers or other form of fiber optic pathway 904. Likewise, optical receptor 920 and optical communications amplifier 922 may be any combination suitable for use in optical communications reception, for example an avalanche photo-diode (APD) and transimpedance amplifier (TIA) configured for use with optical fibers or other form of fiber optic pathway 904.

Of course, a person skilled in the art would readily appreciate that transmitter device 908 and receiver device 910 may include additional devices or components (not shown). For example, devices for further processing and conditioning of serial digital video data signals may be included upstream and/or downstream of devices 912, 914 in one or both of the transmitter and receiver devices 908, 910, for the purpose of incorporating the serial digital video signals into a multi-service data stream transported using a DWDM backbone.

Figure 10:
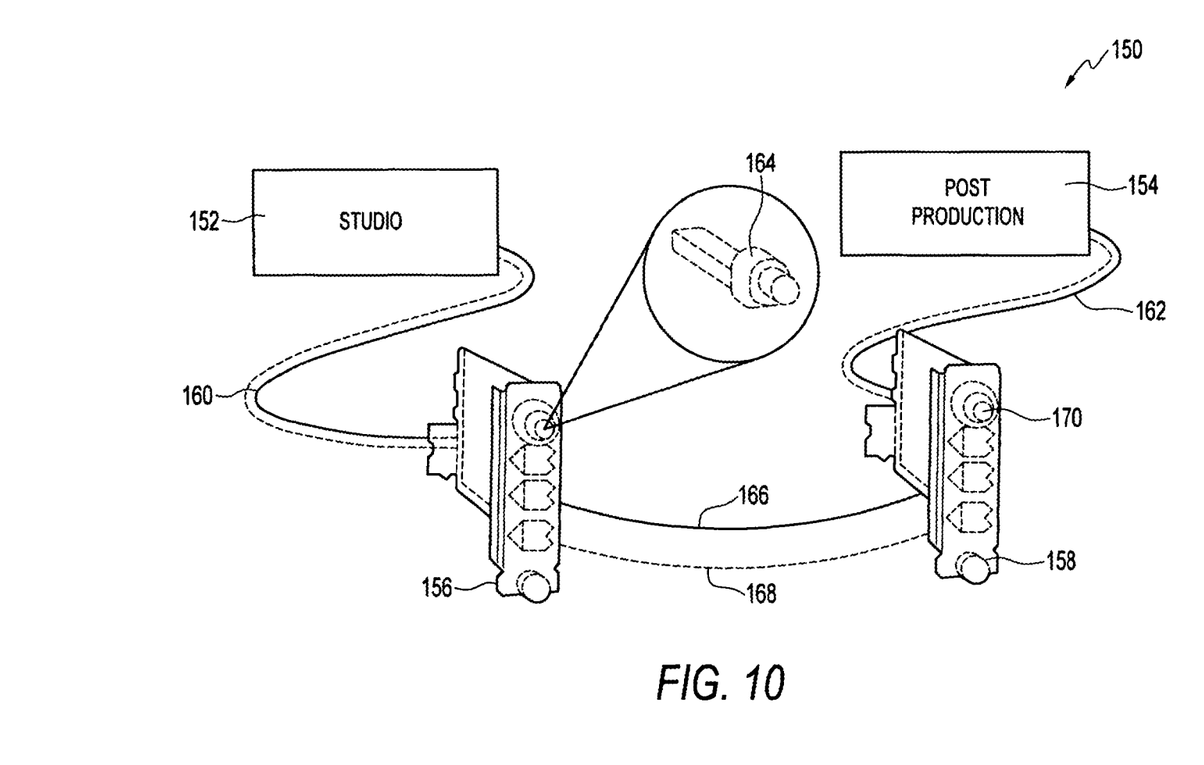
FIG. 10 illustrates an optical communications system formed in accordance with another embodiment of the invention.

FIG. 10 illustrates a digital video data communications system 150 utilizing dithering to eliminate pathological data patterns in accordance with another embodiment of the invention. The digital video data communications system 150 includes a source/server for digital video data such as a studio 152, a server-side data pathway 160, a transmitter device 156, one or more fiber optic pathways 166, 168, a receiver device 158, a client-side pathway 162, and a client/consumer of digital video data such as a post-production facility 154.

The transmitter device 156 includes at least one removable unit 164, for example a small form-factor pluggable (SFP) module known to be compatible with a variety of optical communications equipment. The removable unit 164 includes a signal dithering device 500 (see FIG. 5) configured to accept an input serial digital interface (SDI) data signal. Likewise, the receiver device 158 includes at least one removable unit 170 including a signal un-dithering device 600 (see FIG. 6) configured to reverse dithering applied at the signal dithering device 500 of the removable unit 164.

In operation, the digital video data communications system 150 functions to transport digital video data between the source/server 152 and the client/consumer 154. Raw digital video data may be serialized and encoded according to a known standard, for example SMPTE 259M, at the source/server 152 for transmission via server-side data pathway 160, for example at least one coaxial cable. The resulting serial digital video data signal is transported via pathway 160 to the removable unit 164 at transmitter device 156. At the removable unit 164, a signal dithering device 500 of the type illustrated in FIG. 5 decodes and de-serializes the input serial digital data signal, dithers a least significant bit of the digital video data in parallel form, and re-serializes and encodes the digital video data signal in accordance with the known standard chosen at the source/server 152. In this way, any pathological data patterns that may be present in the digital video data signal at the transmitter device 156 are eliminated to permit more advantageous transmission of the digital video data signal using the one or more fiber optic pathways 166, 168. After dithering, the digital video data may be subjected to further processing and possible multiplexing with other signals for transmission using the fiber optic pathways 166, 168, which may include, for example, a DWDM multi-service backbone.

At the receiver device 158, optical signals including the transmitted digital video data signal are received and may be subjected to further processing and possible demultiplexing. The digital video data signals are provided to the removable unit 170, at which a signal un-dithering device 600 of the type illustrated in FIG. 6 decodes and de-serializes the digital video data signal, un-dithers a least significant bit of the digital video data in parallel form, and re-serializes and encodes the digital video data signal in accordance with the known standard chosen at the source/server 152. In this way, the serial digital video data signal is restored to its state as originally received at removable unit 164, including any pathological data patterns that were present in the digital video data signal on the source/server side. The resulting serial digital video data signal is transported via pathway 162 (e.g. including at least one coaxial cable) to the client/consumer 154, where the raw digital video data may be recovered by decoding and de-serialization in accordance with the known standard chosen at the source/server 152.

A person skilled in the art would readily appreciate that, although transport of digital video data in a single direction (i.e. from source/server 152 to client/consumer 154) is shown and described with reference to FIG. 10, video data may be communicated in either direction in accordance with this or other embodiments of the invention. Those of skill in the art would understand that fiber optic pathways 166, 168 as illustrated in FIG. 10 are not required, and various embodiments of the invention may use additional or substitute pathways for wired, wireless, optically coupled, repeating, transponding, media converting, switching, multicasting, WDM trunk, CWDM, OADM, and/or other types of data communication techniques. For example, serial digital video data may be transported via a link including free space optics (FSO) components between transmitter device 156 and receiver device 158. For another example, serial digital video data may be transported via a link including physical layer switching components between one or more transmitter devices 156 and a plurality of receiver devices 158.

Figure 11:
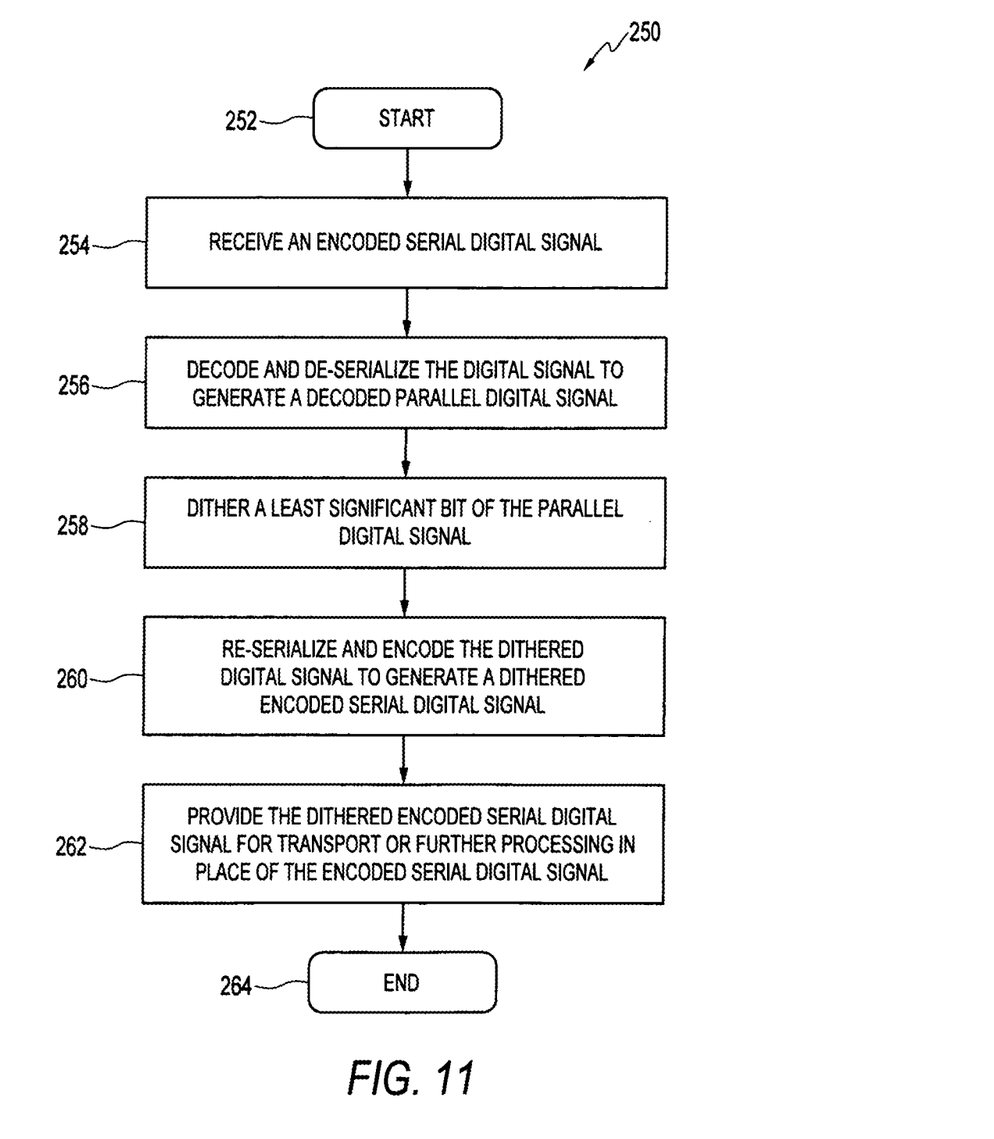
FIG. 11 shows a flow diagram illustrating an exemplary method of processing a digital video signal in accordance with one embodiment of the invention.

FIG. 11 shows a flow diagram representation of a method 700 of dithering a digital video data stream to eliminate pathological data patterns in accordance with another embodiment of the invention. The method 700 includes a receiving step 254, a decoding/de-serialization step 256, a dithering step 258, a re-serialization/encoding step 260, and a provision step 262.

The method 700 begins at step 252 and proceeds to the receiving step 254 in which a serial digital signal is received that has previously been encoded according to a known standard, for example SMPTE 259M. The received serial digital signal may be a serial digital video signal including pathological data patterns that may hinder or prevent successful communication of the signal via certain optical communications systems. For example, given a signal dithering device 500 of the type illustrated in FIG. 5, the encoded serial digital signal may be a serial digital video signal such as a serial digital interface (SDI) signal received at input 502. The receiving step 254 may be accomplished via coupler to a coaxial cable or some other method of receiving wired or wireless signals well known in the art.

The method 150 then proceeds to decoding/de-serialization step 256, in which the received serial digital signal is decoded and de-serialized to generate a parallel digital signal. Decoding is performed to reverse encoding previously applied according to the known standard, for example SMPTE 259M. For example, given a decoding and de-serialization configuration such as configuration 700 illustrated in FIG. 7, decoding of the received serial digital signal may be performed in the decoder 708 to generate a decoded serial digital video data stream. In this example, decoding may be performed to reverse encoding applied using a scrambler 300 of the type shown in FIG. 3. Continuing this example, de-serialization may then be performed in the serial-to parallel converter 710, for example a demultiplexer, thus generating a decoded parallel digital signal.

The method 150 proceeds to dithering step 258, in which an amount of noise is added to the parallel digital signal. This noise is added by dithering a least significant bit (LSB) of each digital data word according to a reversible dithering technique. For example, given a signal dithering device 500 of the type shown and described with reference to FIG. 5, a dithering block 510 may apply dithering via a coupler for the least significant bit of the decoded parallel digital video signal. In this example, a dithering configuration 400 of the type shown in FIG. 4 may be employed to apply noise to the least significant bit of each digital data word using a pseudo random sequence generator formed from a feedback shift register, feedbacks taps, and XOR gates. Although a five-bit pseudo random sequence generator with scrambling polynomial: $G(X)=X^5+X^2+1$ is used in this example, such a scrambling technique is not required, and any reversible scrambling technique amenable to dithering a LSB of a parallel digital signal may be used as should be apparent to those skilled in the art.

The method 250 then proceeds to re-serialization/encoding step 260, in which the dithered parallel digital signal is converted from parallel to serial form and encoded in accordance with the known standard previously employed. For example, for a signal dithering device 500 of the type shown in FIG. 5, encoding/re-serialization block 512 may be used to convert the parallel digital signal into a serial digital signal, for example using a multiplexer, and the serial digital signal may be encoded using a scrambler 300 of the type shown and described with reference to FIG. 3. In this example, the encoded serial digital signal is a serial digital video data signal encoded according to the SMPTE 259M standard.

The resulting serial digital signal may be provided for further processing and transport in provision step 262. Due to the small amount of noise added to the signal in dithering step 258, any pathological data patterns present in the serial digital signal received in receiving step 254 have been eliminated. The resulting serial digital signal formed at re-serialization/encoding step 260 is suitable for use with optical communications systems including one or more fiber optic communication networks employing a multi-service DWDM backbone. For example, given a serial digital video data signal containing pathological data patterns received at receiving step 254, the method 250 may provide a resulting serial digital video data signal devoid of such pathological data patterns to be used in place of the received signal. Of course, the above described method or its reciprocal for un-dithering may be used on both ends of an optical communications system for effective transport of signals including pathological data patterns, as should be readily apparent to those skilled in the art. In this way, the previously mentioned bit errors, data errors, PLL alignment jitter, and the accompanying adverse effects on picture quality may be reduced or avoided using the method of this embodiment of the invention.

The method then proceeds to step 264, where it ends until another encoded serial digital signal is received.

As illustrated in the preceding discussion and accompanying figures, the method and apparatus of the present invention represent an improvement in the state of the art for optical communications of digital video signals and associated methods. Various embodiments of the invention provide improved devices for reducing or eliminating pathological data patterns from signals for transmission over optical communications systems. The improvements may be provided in one or more removable units, such as a small form-factor pluggable (SFP) module compatible with existing optical communications equipment, at a reasonable cost.

While the exemplary embodiments described above have been chosen primarily from the field of optical communication, one of skill in the art will appreciate that the principles of the invention are equally well applied, and that the benefits of the present invention are equally well realized in a wide variety of other communications systems including, for example, electronic command and control systems. Further, while the invention has been described in detail in connection with the presently preferred embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Accordingly, the invention is not to be seen as limited by the foregoing description, but is only limited by the scope of the appended claims.

What is claimed is:

1. A method of transmitting digital data including pathological data patterns comprising:
   dithering a least significant bit of each digital data word in a parallel digital signal;
   serializing the parallel digital signal to form a serial digital signal; and
   transmitting the serial digital signal on an optical pathway.

2. The method of claim 1, further comprising the step of incorporating the digital signal into a multi-service data stream.

3. The method of claim 2, wherein the multi-service data stream is transported using a DWDM backbone.

4. The method of claim 1 further comprising the step of encoding the digital data in accordance with a digital video standard.

5. The method of claim 4, wherein the digital video standard is SMPTE 259M.

6. The method of claim 1, further including the steps of:
   receiving the serial digital signal from the optical pathway;
   de-serializing the serial digital signal to form a parallel digital signal; and
   dithering a least significant bit of each digital data word in the parallel digital signal.

7. The method of claim 1, wherein the method is performed in a single small form factor pluggable module.

8. A method of receiving digital data including pathological data patterns comprising:
   receiving the serial digital signal from the optical pathway;
   de-serializing the serial digital signal to form a parallel digital signal; and
   dithering a least significant bit of each digital data word in the parallel digital signal.

9. The method of claim 8, where the digital signal is part of a multi-service data stream.

10. The method of claim 9, wherein the multi-service data stream is transported using a DWDM backbone.

11. The method of claim 8 further comprising the step of encoding the digital data in accordance with a digital video standard.

12. The method of claim 11, wherein the digital video standard is SMPTE 259M.

13. The method of claim 8, wherein the digital signal includes video content.

14. The method of claim 8, wherein the method is performed in a single small form factor pluggable module.

\* \* \* \* \*